United States Patent [19]

Hagiwara

[11] Patent Number: 5,404,978
[45] Date of Patent: Apr. 11, 1995

[54] VISCOUS COUPLING

[75] Inventor: Makoto Hagiwara, Bonn, Germany

[73] Assignees: GKN Viscodrive GmbH, Lohmar, Germany; Viscodrive Japan Kabushiki Kaisha, Tokyo, Japan

[21] Appl. No.: 103,905

[22] Filed: Aug. 10, 1993

[30] Foreign Application Priority Data

Aug. 17, 1992 [DE] Germany ............... 42 27 095.2

[51] Int. Cl.⁶ ............................................ F16D 35/00
[52] U.S. Cl. ............................. 192/58 C; 192/70.14
[58] Field of Search ............. 192/58 B, 58 C, 58 R, 192/58 A, 70.14

[56] References Cited

U.S. PATENT DOCUMENTS

| | | | |
|---|---|---|---|
| 2,808,140 | 10/1957 | Trofimov | 192/57 |
| 4,989,687 | 2/1991 | Kowka et al. | 192/58 B X |
| 5,041,065 | 8/1991 | Kwoka | 192/58 B X |
| 5,060,775 | 10/1991 | Kwoka | 192/58 B |
| 5,080,211 | 1/1992 | Wiese et al. | |
| 5,148,900 | 9/1992 | Mohan | 192/58 C |
| 5,232,075 | 8/1993 | Mohan | 192/58 C |
| 5,259,488 | 11/1993 | Oberdörster et al. | 192/58 A |

FOREIGN PATENT DOCUMENTS

| | | | |
|---|---|---|---|
| 0340204 | 11/1989 | European Pat. Off. | |
| 2135791 | 2/1972 | Germany . | |
| 1357106 | 6/1974 | United Kingdom | 192/58 B |

Primary Examiner—Richard M. Lorence
Attorney, Agent, or Firm—Harness, Dickey & Pierce

[57] ABSTRACT

A viscous coupling has first planar plates which are held and spaced in a housing of the viscous coupling. Second slotted plates, each received and movably held between two first plates, are also positioned in the housing. The second plates (24) include slots (36) which start from the outer circumferential face (32) of the plate (24) and extend over a limited part of the radial extension of the annular plate (24). The slots (36) are each defined by edges (38, 39) which protrude from a planar face of the plate (24). Via the edges, the second plates come into contact with the adjoining first plates which are fixed so as to be spaced. The sector (40) formed between the circumferential face (32), two adjoining slots (36) and an imaginary circle (41) at the slot end (37) of the slots (36) is provided with an aperture (42) to discharge viscous fluid contained therein.

6 Claims, 2 Drawing Sheets

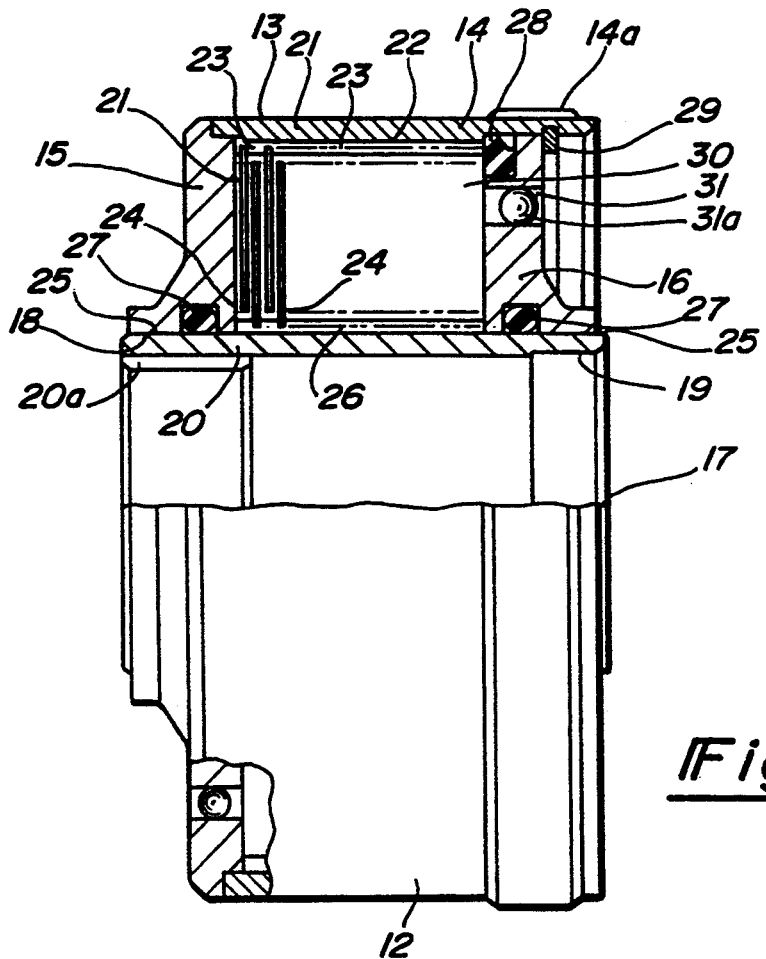
Fig-2
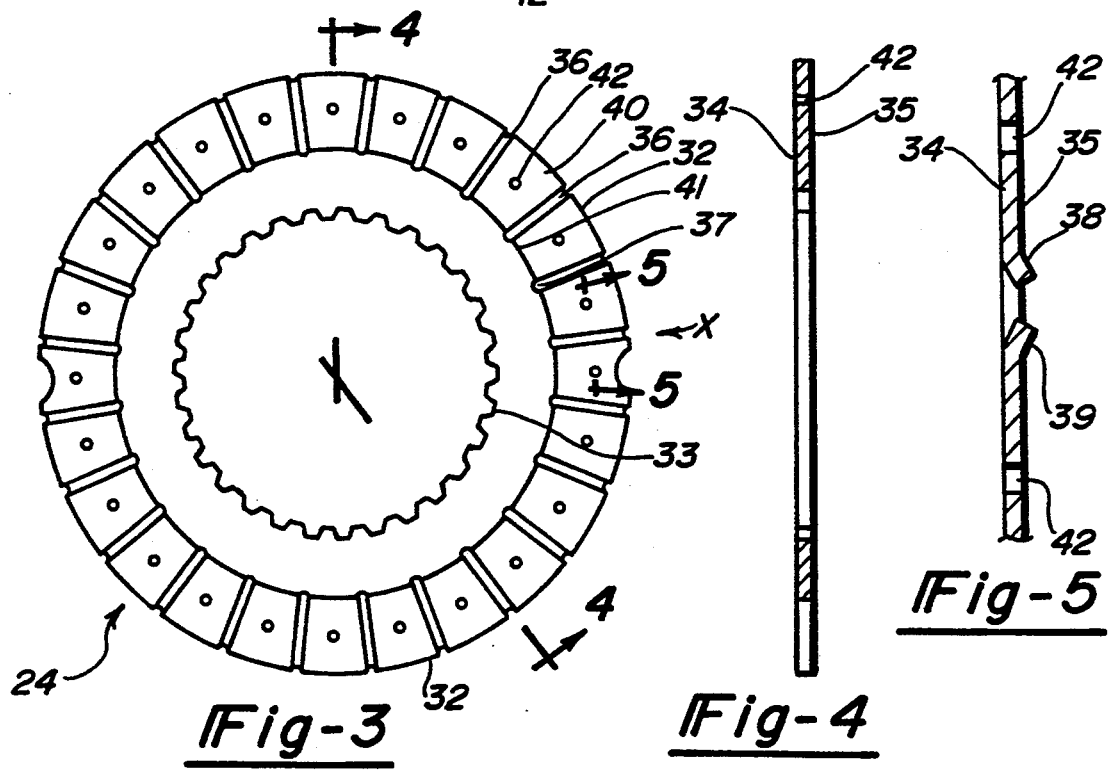
Fig-3
Fig-4
Fig-5

VISCOUS COUPLING

BACKGROUND OF THE INVENTION

The invention relates to a viscous coupling with a housing including a housing casing and covers attached to its ends and which extend radially relative to the rotational axis. A hub is received in the covers so as to be rotatable around the rotational axis. First annular plates include apertures, especially arranged so as to be distributed, and having side faces which are designed to be planar, with the plates, via one of their circumferential faces, being non-rotatingly associated with one of the two coupling parts, the housing or hub, and the plates are held at a distance relative to one another. Second annular plates, via one of their circumferential faces, are associated with the respective other coupling part, the hub or housing, so as to be non-rotating and movable along the rotational axis. At least one second plate is arranged between two spaced first plates. The second plates, starting from the circumferential face which does not serve to establish a non-rotating connection, are provided with circumferentially distributed slots which extend along part of the annular thickness and whose edges are formed in such a way that they all project axially from a planar side face of the sectors formed between the slots. Also, the first and second plates at least partially overlapping in the radial direction. A high-viscosity viscous fluid, especially silicone oil, at least partially fills the interior part of the housing which is not occupied by plates.

Viscous couplings are known, for example U.S. Pat. Nos. 4,989,687 and 5,041,065, where the movable plates are divided by slots into sectors. The slots include limiting edges which project towards one side from the planar faces. The plates, which are secured so as to be spaced, are designed to be planar and they include two planar faces. The fixed and spaced plates may, optionally, be provided with apertures distributed on their annular faces. When a speed differential exists, the unfixed plates axially move between the housing and the hub, in the teeth, in the direction of the adjoining fixed, stationary plates, with their edges projecting in the direction thereof. Such movement is caused by the resulting hydro-dynamic effect favored by the edges because, as described in the above-mentioned publications, they form a running-in funnel and above all it is caused by the pressure differential.

Such movement continues until the movable plates provided with slots and bent edges abut the adjoining fixed plates. This also occurs during the so-called hump mode in the process of which there occurs friction-locking between the axially movable plates and the stationary plates. If the speed differential increases considerably, the rise in temperature causes a considerable increase in the pressure differential and there occurs the so-called hump mode. Because of the full friction locking effect, the speed differential during the hump mode approaches approximately zero, so that the transferable torque is clearly increased. The friction locking effect, especially during the hump mode, causes individual plate particles to be abraded. The separated metal particles are absorbed by the viscous fluid, but have a damaging effect on the service life and on the effect of the viscous fluid. It has been found that, in use, the viscous fluid gels (silicone oil with a high viscosity of 5,000 to 300,000 cSt). This, in turn, limits the service life of the coupling.

SUMMARY OF THE INVENTION

It is an object of the invention to provide a viscous coupling where increased service life of the fluid is achieved. The objective is achieved by providing at least one aperture in each of the sectors of the second plates.

In the viscous mode, the apertures, within certain limits, reduce the speed differential so that even when the plates rest against the counter-plates, there is less friction with a normal pressure differential. However, when the speed differential values increase, pressure compensation cannot occur that quickly so that a so-called hump effect occurs, which is the position where there occurs friction locking between the movable plate and the fixed, stationary plate. At a high speed differential, the amount of viscous fluid discharged via the contacting edges from the region between two slots is greater than the amount subsequently flowing through the apertures so that contact between the axially movable plates, via the edges of their slots, and the opposed stationary plates is accelerated. In the process, the sectors bend through and the apertures are closed. In consequence, the differential speed is also reduced so that there occurs a reduction in abrasion as well. The contact force applied by the edges to the opposed planar faces of the stationary plates is increased. This means that the condition where the plates no longer carry out a relative movement is reached more quickly. As the amount of abrasion is reduced, the service life is increased, and the gelling effect occurs at a much later stage.

The second plates preferably have a thickness of 0.4 mm to 1 mm. An advantageous design is obtained by designing the apertures as cylindrical bores.

A particularly advantageous effect is achieved if each aperture, occupies an area percentage of about 3% to 25% of the area of the sector; which is defined by two adjoining slots, the circumferential face from which the slots start, and an imaginary circle reaching the slot end. The apertures are preferably arranged in the centers of the sectors.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the viscous coupling and its application in a motor vehicle are illustrated in the drawing wherein:

FIG. 2 is a partial longitudinal sectional view through a viscous coupling in accordance with the present invention.

FIG. 3 is a plan view of a planar face of a second plate.

FIG. 4 is a sectional side view of FIG. 3 through line 4—4 thereof.

FIG. 5 is a detail cross sectional view of FIG. 3 along line 5—5 thereof.

DETAILED DESCRIPTION OF THE PREFERRED EMBODIMENTS

Figure 1:
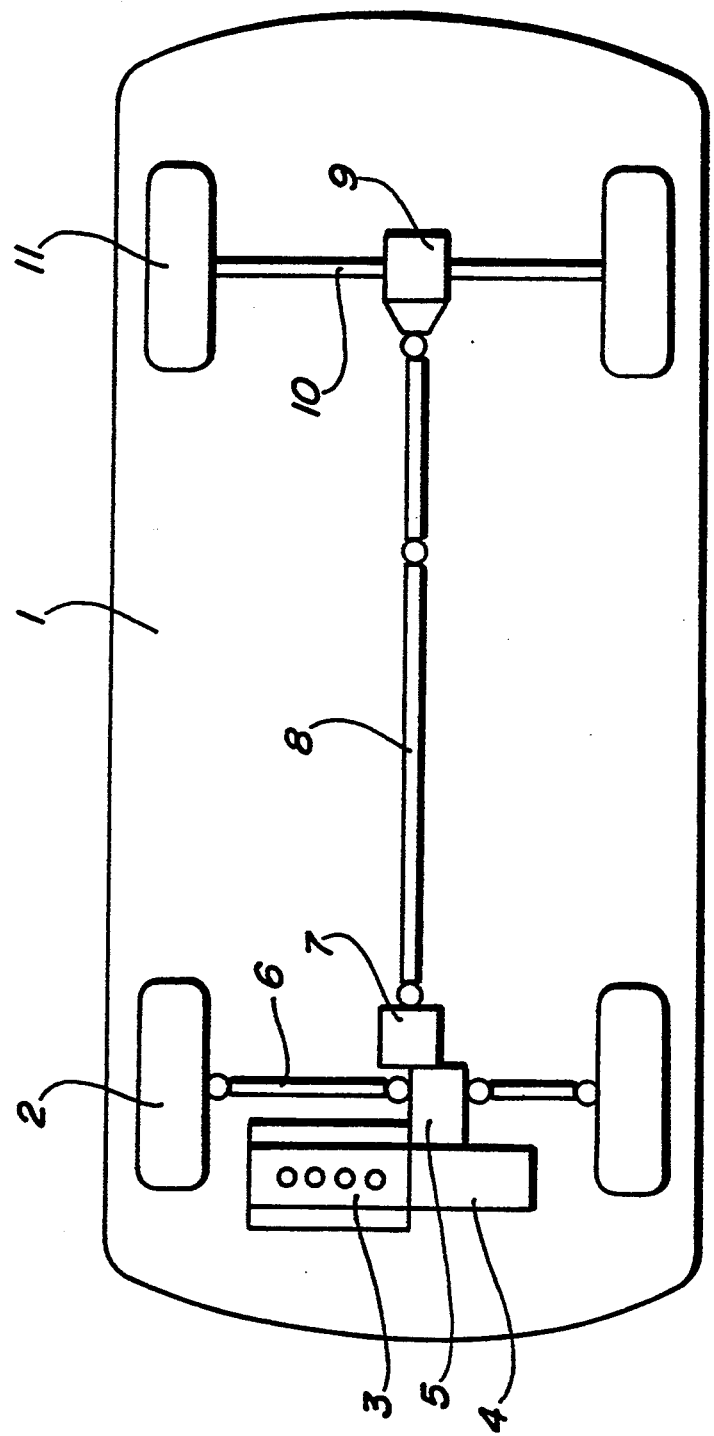
FIG. 1 is a schematic view of a four-wheel drive vehicle.

FIG. 1 illustrates the drive concept for a four-wheel drive vehicle 1. The two front wheels 2 are driven by an engine 3, a reduction gear 4, front axle differential 5 shared by the two front wheels 2 and one sideshaft each. The rotational movement is branched off from the front axle differential 5 via the distributor box 7 and transmitted to the propeller shaft 8. The propeller shaft 8 drives the rear axle differential 9 which serves to pass on the driving movement via the sideshafts 10 to the two rear wheels 11.

The drive concept of vehicle 1 may be such that the rear wheels 11 and the front wheels 2 are permanently driven or the rear wheels 11 are connected only in those cases where the permanently driven front wheels 2 move on ground with a low friction coefficient and where slip occurs relative to the ground. The viscous coupling which will be described in greater detail with reference to FIGS. 2 to 5 serves to pass on the rotational movement to the wheels which are not permanently driven as soon as slip occurs at the driven wheels. For this purpose, the viscous coupling may be associated with the differential of one of the axles and also with the driveline operating between the two axles.

The viscous coupling 12 illustrated in FIG. 2 has a housing 13. The housing 13 includes a substantially cylindrical housing casing 14 which, on its outer face for example, is provided with driving teeth 14a to connect the casing to a driving or driven part of the driveline. The axial ends of the substantially hollow cylindrical housing casing 14 are connected to covers 15, 16 which extend radially inwardly towards the rotational axis 17. At its outer circumference, the cover 15 is welded to the housing casing 14 and, via a seat face, received in a centered way in a corresponding recess of the housing casing 14. The second cover 16 is inserted into a bore of the housing casing 14 and secured against axial displacement on the one hand by teeth 22 which project from the inner face of the housing casing 14 towards the rotational axis 17, and on the other hand by a securing ring 29. The seal 28 has a sealing effect relative to the housing casing 14.

The two housing covers 15, 16 each include a bore 18 and 19, respectively. A hub 20, via its cylindrical seat faces 25, is received in the bores 18, 19 so as to be able to carry out a relative rotational movement.. Its axial movement is limited by radially outwardly projecting, circumferentially distributed teeth 26. Seals 27 are provided between the bores 18, 19 of the two covers 15, 16 and the respective seat faces 25 of the hub 20. The teeth 22 and 26 of the housing 13 and hub 20 extend parallel to the rotational axis 17. The central bore of the hub 20 is provided with driving teeth 20a via which it may be connected to a driving or driven member of the driveline of the vehicle 1.

Via their profiled outer circumference, the first plates 21 are non-rotatingly accommodated in the teeth 22. A spacing ring 23 is always arranged between two first plates 21. The spacing ring 23 holds the first plates 21 at an axial distance from one another. In the embodiment illustrated, two second plates 24 are arranged between each two first plates 21. Via teeth provided at their inner circumference, the second plates 24 are received in the teeth 26 of the hub 20 so as to be non-rotating and, in addition, movable along the rotational axis 17. The second plates 24 are not spaced relative to one another.

It is also possible for only one second plate 24 to be arranged between two first plates 21.

The part of the interior 30 of the housing 13 not occupied by plates 21, 24 is at least partially filled with a highly viscous silicone oil with a viscosity ranging between 5,000 and 300,000 cSt (centistokes). The fluid is filled in via the filling bore 31 which is closed by the closing ball 31a.

If there occurs a speed differential, a relative rotation of the housing 13 and hub 20 around the rotational axis 17 relative to one another, the viscous fluid contained in the space between the radially overlapping plates 21, 24 is sheared. The temperature increases and, in consequence, the pressure builds up in the interior 30 of the housing 13. Such a pressure build-up in connection with the design of the second plates 24, which will be explained below with reference to FIGS. 3 to 5, causes the second plates 24 to move axially towards the adjoining first plate until they contact one another.

With prior art designs, such a condition can occur even at small speed differential values because the speed differential leads to a pressure differential. Slight speed differentials occur as a result of certain design features. This results in an axial movement of the unfixed plates. If the speed differential increases further, a friction locking effect occurs to the extent that this leads to a definite increase in the transferable torque.

The coupling has been transferred from the so-called viscous mode where the viscous fluid is sheared only to where mixed conditions exist, into the so-called hump mode where torque is transmitted due to the friction locking effect, at this speed differential is approximately zero. The mixed conditions where there does not exist a pure viscous mode and the speed of transfer into the hump mode where there is practically no speed differential between the abutting plates 21, 24 have a decisive effect on the amount of friction-related wear. The smaller the total number of relative movements of the plates when being transferred from the viscous mode into the hump mode, the smaller the amount of wear and the less damage is done to the viscous fluid. The service life of the viscous coupling is increased accordingly.

The second plate 24 as illustrated in FIGS. 3 to 5 is annular in design. It is relatively thin (approx. 0.4 to 1 mm, depending on the diameter) and is manufactured from steel. The surfaces are treated to improve the wear behavior. The inner circumferential face 33 of the plate 24 is provided with teeth matching the outer teeth 26 of the coupling hub 20 illustrated in FIG. 2.

The outer circumferential face has been given the reference number 32. The outer circumferential face 32, which does not serve to establish a non-rotating connection with the hub 20 serves as the starting region for circumferentially distributed slots 36 extending over a limited radial length. The slot ends have been given the reference number 37. An imaginary circle 41 touching the slot ends 37 is also shown.

A sector 40 is formed between two circumferentially adjoining slots 36, the outer circumferential face 32 and the imaginary circle 41. The sectors 40 include two planar faces 34, 35. The slots 36 include edges 38, 39 projecting from one of the two planar faces, usually from the planar face 35 by 0.03 to 0.05 mm. The sectors 40 are provided with apertures 42 in the form of bores for example. As a result of the edges 38, 39 there is formed a kind of funnel which advantageously affects the hydro-dynamic effect in the case of a speed differential, thus accelerating the axial movement of the plate 24 in order to bring it into contact with the adjoining plate 21 held in a stationary condition in the housing 13. The direction of movement is determined by the design of the slots 36 with their projecting edges 38, 39.

In the case of the embodiment illustrated, the plate 24 moves in such a way that the edges 38, 39 come to rest against the planar face of the next adjoining stationary plate 21, as shown in FIG. 2, establishing friction locking contact therewith, with the edges 38, 39 closely reacting against the surface of the adjoining stationary plate 21. Because the edges 38, 39 come to rest against the opposed planar face of the adjoining stationary plate, viscous fluid is discharged from the space enclosed by the edges 38, 39, thereby increasing both the pressure differential relative to the other planar face of the movable plate 24 and the contact pressure.

The apertures 42 provided in accordance with the invention ensure that the unfavorable mixed conditions are improved. If, at a smaller speed differential, the plate 24 provided with edges 38, 39 is already in contact with the adjoining stationary plate 21, the pressure differential is reduced to a certain extent. As a result of the apertures, viscous fluid is able to flow, via the apertures 42, into the space between the two edges 38, 39 of a sector 40. The viscous mode is maintained, which means that the amount of metal abrasion is reduced. However, if the speed differential is higher, pressure compensation cannot take place at the same speed because of the dimensions of the apertures. The increase in pressure caused by the resulting rise in temperature and the resulting pressure differential lead to a rapid transfer into the hump mode.

Because of the high contact forces, the sectors 40 become resilient and bend until they contact the planar face of the stationary plate 21. As a result, the apertures 42 are closed. Because the speed differential approaches zero, the viscous fluid cannot enter the space of the sectors 40 between the two edges 38, 39.

While the above detailed description describes the preferred embodiment of the present invention, the invention is susceptible to modification, variation, and alteration without deviating from the scope and fair meaning of the subjoined claims.

I claim:

1. A viscous coupling comprising:
   a housing having a housing casing and covers, wherein said covers are attached to casing ends and extend radially relative to a rotational axis;
   a hub received in the covers and being rotatable around the rotational axis;
   first annular plates being arranged so as to be spaced a distance relative to one another, and including apertures and side faces wherein said side faces are designed to be planar, said first plates, via one of the circumferential faces, being non-rotatingly associated with either of said housing or hub, and being held at said distance relative to one another;
   second annular plates which, via one of their circumferential faces, are attached to the respective other hub of the housing so as to be non-rotating relative to the hub or the housing to which they are attached and movable along the rotational axis, with at least one second plate being arranged between two spaced first plates, and include sectors, wherein said sectors formed on the second plates are defined by the circumferential face which does not serve to establish a non-rotating connection, circumferentially distributed slots which extend along part of the annular thickness of the plate and an imaginary circle through ends of said slots, wherein said slots have edges formed in such a way that they all project axially from a planar side face of the sectors formed between the slots, such that a funnel shape is formed from said edges which acts to accelerate the axial movement of the second plate toward the first plate in the case of a speed differential, and with the first and second plates, at least partially overlapping in the radial direction;
   a high-viscosity viscous fluid which at least partially fills the part of the interior of the housing which is not occupied by plates; and
   at least one aperture is provided in each of the sectors of the second plates, wherein the second plate apertures are arranged within the sectors allowing viscous fluid to flow into the space between the edges to prolong the viscous mode and reduce metal abrasion.

2. A viscous coupling according to claim 1, wherein the second plates have a thickness of about 0.4 mm to 1 mm.

3. A viscous coupling according to claim 1, wherein the second plate aperture is designed as a cylindrical bore.

4. A viscous coupling according to claim 1, wherein an area percentage in which the second plate aperture or apertures occupy is about 3% to about 25% of the area of the sector defined by two adjoining slots, the circumference of the second plate from which the slots start, and by the imaginary circle reaching the slot end.

5. A viscous coupling according to claim 1, wherein, in each case, the second plate apertures are arranged in the centers of the sectors.

6. A viscous coupling according to claim 1, wherein the viscous fluid is silicone oil.

* * * * *